United States Patent
Wells et al.

(10) Patent No.: US 6,920,762 B2
(45) Date of Patent: Jul. 26, 2005

(54) MOUNTING ASSEMBLY FOR IGNITER IN A GAS TURBINE ENGINE COMBUSTOR HAVING A CERAMIC MATRIX COMPOSITE LINER

(75) Inventors: Thomas Allen Wells, West Chester, OH (US); David Edward Bulman, Cincinnati, OH (US); Mark Eugene Noe, Morrow, OH (US); Harold Ray Hansel, Mason, OH (US); Christopher Charles Glynn, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 10/341,850

(22) Filed: Jan. 14, 2003

(65) Prior Publication Data

US 2005/0072163 A1    Apr. 7, 2005

(51) Int. Cl.[7] ............................................. F02C 7/266
(52) U.S. Cl. ...................... 60/799; 60/800; 60/39.821; 60/39.827
(58) Field of Search ........ 60/799, 800, 39.821–39.828; 267/290

(56) References Cited

U.S. PATENT DOCUMENTS

| | | | | |
|---|---|---|---|---|
| 2,030,263 | A | * | 2/1936 | Mercer, Jr. .................. 267/290 |
| 3,007,312 | A | * | 11/1961 | Shutts ...................... 60/39.821 |
| 3,048,015 | A | | 8/1962 | Barrelle et al. |
| 3,911,672 | A | * | 10/1975 | Irwin .......................... 60/800 |
| 3,924,403 | A | | 12/1975 | Irwin |
| 4,216,651 | A | * | 8/1980 | Ormerod ................. 60/39.827 |
| 4,903,476 | A | * | 2/1990 | Steber et al. ............ 60/39.827 |
| 5,285,632 | A | | 2/1994 | Halila |
| 5,291,732 | A | | 3/1994 | Halila |
| 5,291,733 | A | | 3/1994 | Halila |
| 5,353,587 | A | | 10/1994 | Halila |

(Continued)

FOREIGN PATENT DOCUMENTS

JP     56-50223    *  5/1981

OTHER PUBLICATIONS

"ESPR Combustor Concept," Kawasaki Heavy Industries, Ltd. (Mar. 2000), Cover sheet and figure (partially screened).

(Continued)

*Primary Examiner*—Ted Kim
(74) *Attorney, Agent, or Firm*—William Scott Andes; James P. Davidson

(57) ABSTRACT

An assembly for mounting an igniter in a gas turbine engine combustor between an outer casing and an outer liner, wherein a longitudinal centerline axis extends through the gas turbine engine. The igniter mounting assembly includes a first spring member encircling a portion of said igniter and being positioned between a surface adjacent the outer casing and an outer surface of the outer liner, a first ring member connected to a first end of the first spring member adjacent the outer surface of the outer liner, and a second ring member connected to a second end of the first spring member adjacent the surface adjacent the outer casing. Accordingly, the igniter is able to maintain substantial alignment with respect to an opening in the outer liner while moving radially and/or axially with respect to the outer liner as the outer casing experiences thermal growth greater than the outer liner.

23 Claims, 6 Drawing Sheets

U.S. PATENT DOCUMENTS

| | | |
|---|---|---|
| 5,363,643 A | 11/1994 | Halila |
| 5,425,531 A * | 6/1995 | Perrault ................ 267/290 |
| 5,592,814 A | 1/1997 | Palusis et al. |
| 6,397,603 B1 | 6/2002 | Edmondson et al. |
| 6,438,940 B1 | 8/2002 | Vacek et al. |
| 6,442,929 B1 * | 9/2002 | Kraft et al. .............. 60/39.827 |
| 2002/0108378 A1 | 8/2002 | Ariyoshi et al. |

OTHER PUBLICATIONS

Hiroyuki Ninomiya et al., "Development of Low NOx LPP Combustor," The First International Symposium of Environmentally Compatible Propulsion System for Next-Generation Supersonic Transport, Tokyo, Japan (May 21-22, 2002), p. 1-6.

* cited by examiner

MOUNTING ASSEMBLY FOR IGNITER IN A GAS TURBINE ENGINE COMBUSTOR HAVING A CERAMIC MATRIX COMPOSITE LINER

STATEMENT REGARDING FEDERALLY SPONSORED RESEARCH AND DEVELOPMENT

The U.S. Government may have certain rights in this invention pursuant to contract No. NAS3-27720.

BACKGROUND OF THE INVENTION

The present invention relates generally to the use of Ceramic Matrix Composite liners in a gas turbine engine combustor and, in particular, to the mounting of an igniter between an outer casing and an outer liner of the combustor so as to accommodate differences in thermal growth.

It will be appreciated that the use of non-traditional high temperature materials, such as Ceramic Matrix Composites (CMC), are being studied and utilized as structural components in gas turbine engines. There is particular interest, for example, in making combustor components which are exposed to extreme temperatures from such material in order to improve the operational capability and durability of the engine. As explained in U.S. Pat. No. 6,397,603 to Edmondson et al., substitution of materials having higher temperature capabilities than metals has been difficult in light of the widely disparate coefficients of thermal expansion when different materials are used in adjacent components of the combustor. This can result in a shortening of the life cycle of the components due to thermally induced stresses, particularly when there are rapid temperature fluctuations which can also result in thermal shock.

Accordingly, various schemes have been employed to address problems that are associated with mating parts having differing thermal expansion properties. As seen in U.S. Pat. No. 5,291,732 to Halila, U.S. Pat. No. 5,291,733 to Halila, and U.S. Pat. No. 5,285,632 to Halila, an arrangement is disclosed which permits a metal heat shield to be mounted to a liner made of CMC so that radial expansion therebetween is accommodated. This involves positioning a plurality of circumferentially spaced mount pins through openings in the heat shield and liner so that the liner is able to move relative to the heat shield.

U.S. Pat. No. 6,397,603 to Edmondson et al. also discloses a combustor having a liner made of Ceramic Matrix Composite materials, where the liner is mated with an intermediate liner dome support member in order to accommodate differential thermal expansion without undue stress on the liner. The Edmondson et al. patent further includes the ability to regulate part of the cooling air flow through the interface joint.

It is known to use an igniter ferrule in current metal combustors, where the ferrule is welded to the outer liner. In this way, the ferrule allows for relative movement of the metal liner and the combustor casing/igniter, as well as prevents excessive air flow from entering the combustor around the igniter hole in the outer liner. It will be appreciated that such an igniter ferrule cannot be utilized with the CMC liner because there is no way to weld or otherwise attach the metal ferrule thereto. Further the igniter hole required in the outer liner to accommodate relative axial movement between the CMC liner and the combustor casing cannot be left open because the combustor likely will be unable to light.

Accordingly, it would be desirable for a mounting assembly to be developed for an igniter in a combustor having a CMC liner which is able to accommodate differences in axial and radial growth between such liner and an outer casing of the combustor. Further, it would be desirable for such mounting assembly to enable use of an opening in the outer liner which is configured to assist in accommodating relative axial movement between the outer liner and the combustor casing without exposing the combustion chamber to excess air.

BRIEF SUMMARY OF THE INVENTION

In a first exemplary embodiment of the invention, an assembly for mounting an igniter in a gas turbine engine combustor between an outer casing and an outer liner is disclosed, wherein a longitudinal centerline axis extends through the gas turbine engine. The igniter mounting assembly includes a first spring member positioned between a surface adjacent the outer casing and an outer surface of the outer liner, a first ring member connected to a first end of the first spring member adjacent the outer surface of the outer liner, and a second ring member connected to a second end of the first spring member adjacent the surface adjacent the outer casing. Accordingly, the igniter is able to maintain substantial alignment with respect to an opening in the outer liner while moving radially with respect to the outer liner as the outer casing experiences thermal growth greater than the outer liner. The outer liner opening may be configured so that the igniter is able to maintain substantial alignment with respect to the outer liner opening while moving axially with respect to the outer liner as the outer casing experiences thermal growth greater than the outer liner.

In a second exemplary embodiment of the invention, a combustor for a gas turbine engine having a longitudinal centerline axis extending therethrough is disclosed as including: an outer liner having a forward end and an aft end, the outer liner being made of a ceramic matrix composite material and having an opening formed therein; an outer casing spaced radially from the outer liner so as to form an outer passage therebetween, the outer casing being made of a metal and having an opening formed therein substantially aligned with the outer liner opening; an igniter fixedly connected to the outer casing and positioned so as to extend through the opening in the outer casing; and, an assembly for mounting the igniter between the outer casing and the outer liner. Accordingly, the igniter is able to maintain substantial alignment with respect to the opening in the outer liner while moving radially with respect to the outer liner as the outer casing experiences thermal growth greater than the outer liner. The opening in the outer liner may be substantially ovular, wherein the igniter is able to maintain substantial alignment with respect to the outer liner opening while moving axially with respect to the outer liner.

In accordance with a third embodiment of the invention, a method of mounting an igniter between an outer casing and an outer liner of a combustor in a gas turbine engine is disclosed, wherein the outer liner is made of a material having a lower coefficient of thermal expansion than the outer casing. The method includes the steps of fixedly connecting the igniter to the outer casing so as to extend through an opening in the outer casing and mounting the igniter between the outer casing and the outer liner in a manner so as maintain substantial alignment with an opening in the outer liner during radial and/or axial movement of the outer casing with respect to the outer liner. The method may also include the step of configuring the outer liner opening in a manner so as to maintain substantial alignment between the igniter and the outer liner opening during axial movement of the outer casing with respect to the outer liner.

DETAILED DESCRIPTION OF THE INVENTION

Figure 1:
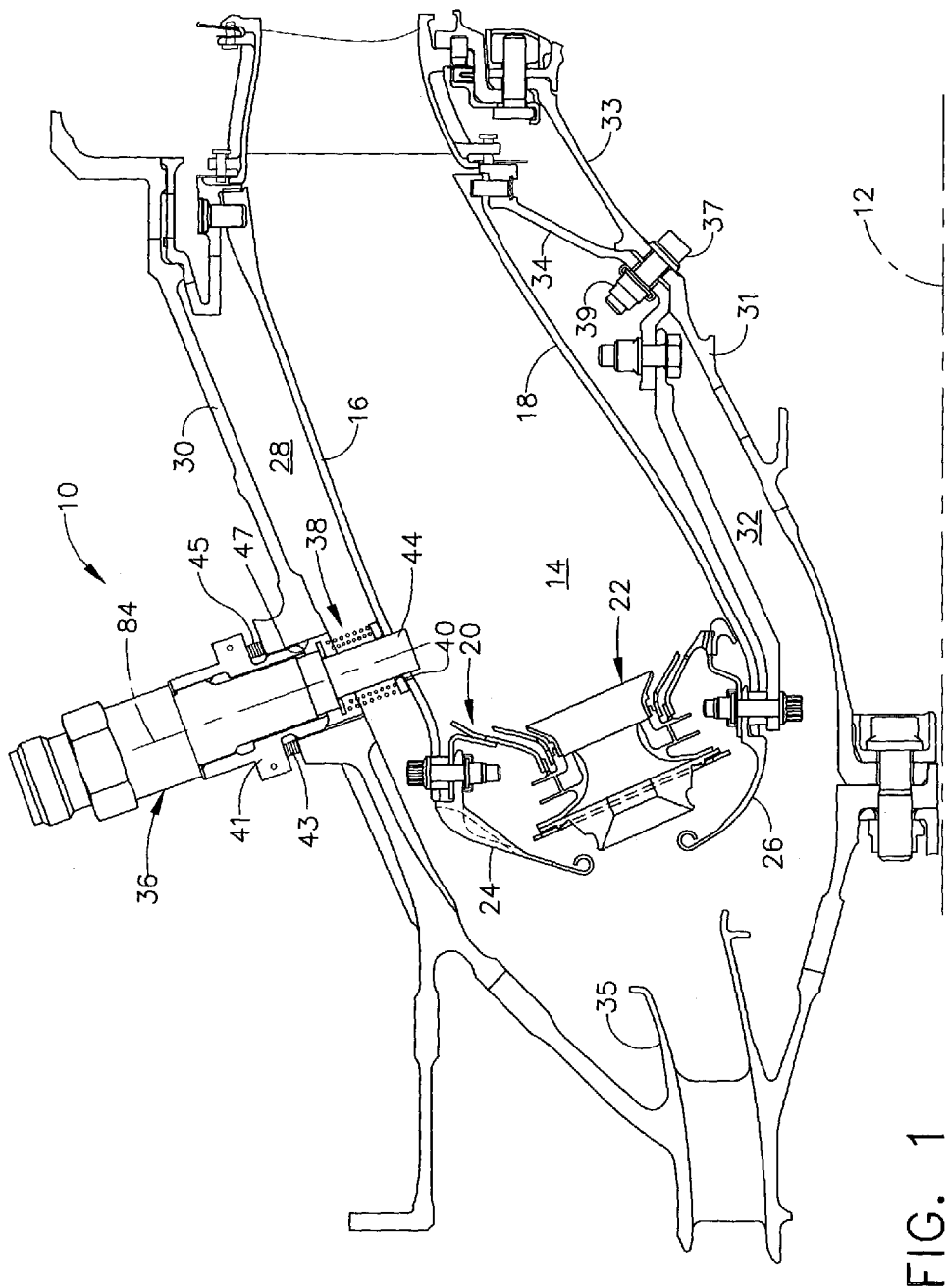
FIG. 1 is a cross-sectional view of a gas turbine engine combustor having an outer liner made of ceramic matrix material and including an igniter mounted in accordance with the present invention.

Referring now to the drawings in detail, wherein identical numerals indicate the same elements throughout the figures, FIG. 1 depicts an exemplary gas turbine engine combustor 10 which conventionally generates combustion gases that are discharged therefrom and channeled to one or more pressure turbines. Such turbine(s) drive one or more pressure compressors upstream of combustor 10 through suitable shaft(s). A longitudinal or axial centerline axis 12 is provided through the gas turbine It will be seen that combustor 10 further includes a combustion chamber 14 defined by an outer liner 16, an inner liner 18 and a dome 20. Combustor dome 20 is shown as being single annular in design so that a single circumferential row of fuel/air mixers 22 are provided within openings formed in such dome 20, although a multiple annular dome may be utilized. A fuel nozzle (not shown) provides fuel to fuel/air mixers 22 in accordance with desired performance of combustor 10 at various engine operating states. It will also be noted that an outer annular cowl 24 and an inner annular cowl 26 are located upstream of combustion chamber 14 so as to direct air flow into fuel/air mixers 22, as well as an outer passage 28 between outer liner 16 and an outer casing 30 and an inner passage 32 between inner liner 18 and an inner casing 31. An inner support cone 34 is further shown as being connected to a nozzle support 33 by means of a plurality of bolts 37 and nuts 39. In this way, convective cooling air is provided to the outer surfaces of outer and inner liners 16 and 18 and air for film cooling is provided to the inner surfaces of such liners. A diffuser 35 receives the air flow from the compressor(s) and provides it to combustor 10. An igniter 36 is provided so as to igniter the fuel/air mixture supplied to combustion chamber 14.

It will be appreciated that outer and inner liners 16 and 18 are preferably made of a Ceramic Matrix Composite (CMC), which is a non-metallic material having high temperature capability and low ductility. Exemplary composite materials utilized for such liners include silicon carbide, silicon, silica or alumina matrix materials and combinations thereof. Typically, ceramic fibers are embedded within the matrix such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYR-ANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials typically have coefficients of thermal expansion in the range of about $1.3 \times 10^{-6}$ in/in/° F. to about $3.5 \times 10^{-6}$ in/in/° F. in a temperature range of approximately 1000–1200° F.

By contrast, outer casing 30 is typically made of a metal, such as a nickel-based superalloy (having a coefficient of thermal expansion of about $8.3$–$8.6 \times 10^{-6}$ in/in/° F. in a temperature range of approximately 1000–1200° F.) or cobalt-based superalloy (having a coefficient of thermal expansion of about $9.2$–$9.4 \times 10^{-6}$ in/in/° F.). Thus, liners 16 and 18 are better able to handle the extreme temperature environment presented in combustion chamber 14 due to the materials utilized therefor, but mounting igniter 36 thereto via outer casing 30 presents a separate challenge.

Figure 2:
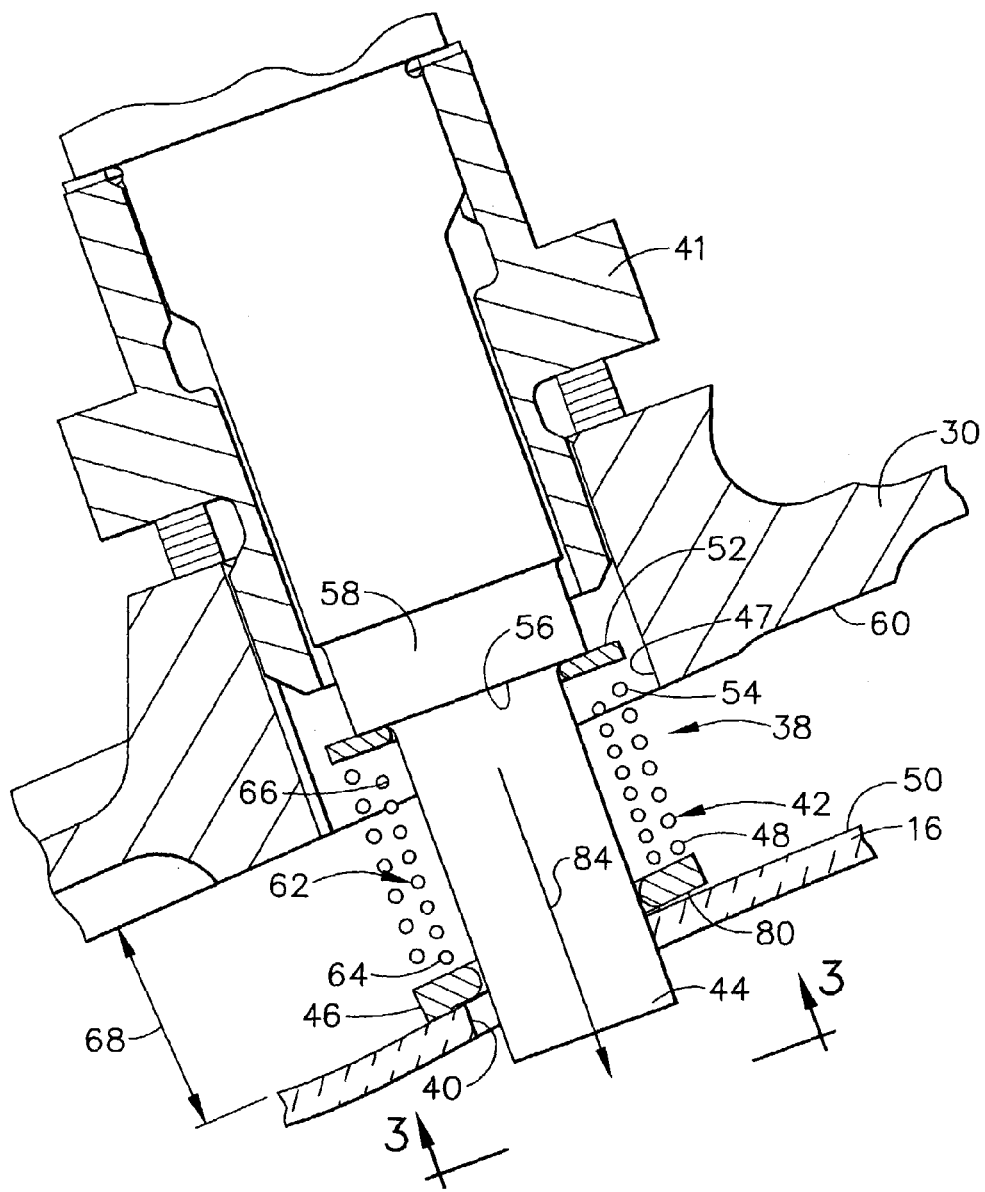
FIG. 2 is an enlarged, partial cross-sectional view of the combustor depicted in FIG. 1, where a mounting assembly for an igniter between an outer casing and an outer liner is shown in the assembled position.
Figure 3:
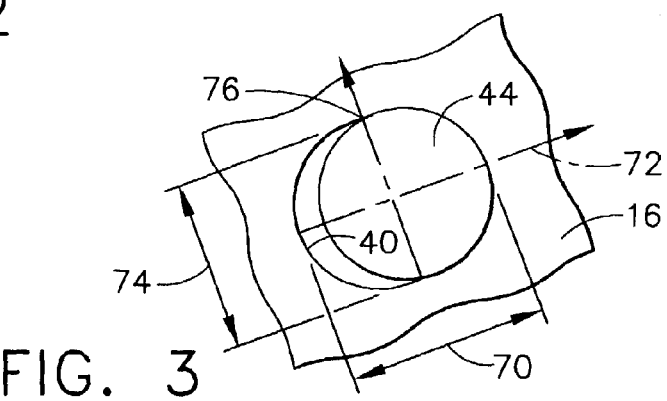
FIG. 3 is a partial bottom view of the igniter depicted in FIG. 2 taken along line 3—3.
Figure 4:
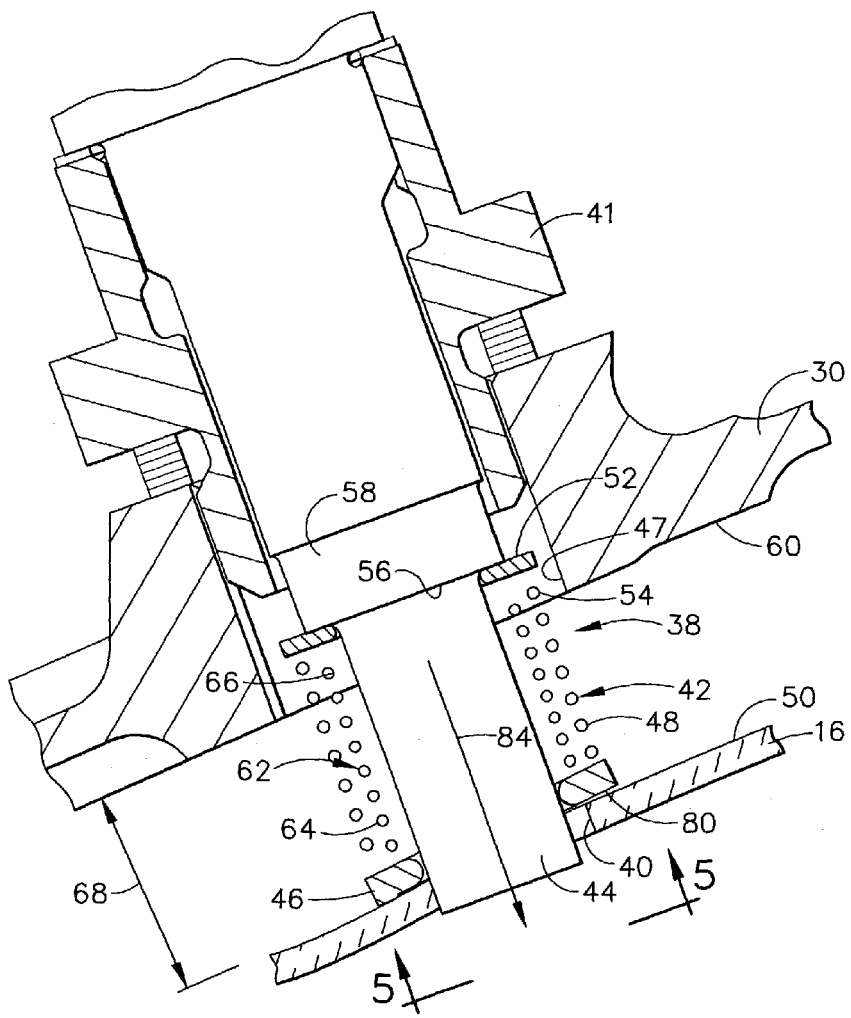
FIG. 4 is an enlarged, partial cross-sectional view of the combustor depicted in FIG. 1, where the mounting assembly for the igniter is shown after thermal growth has occurred.
Figure 5:
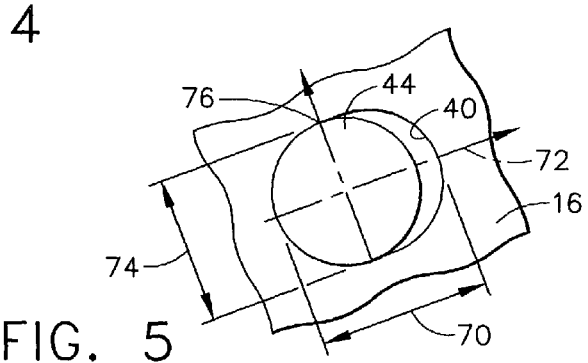
FIG. 5 is a partial bottom view of the igniter depicted in FIG. 4 taken along line 5—5.

Accordingly, it will be seen in FIGS. 1–4 that a mounting assembly 38 is provided for igniter 36 so that it is properly positioned between outer casing 30 and outer liner 16 (i.e., substantial alignment with an opening 40 in outer liner 16). It will be appreciated that igniter mounting assembly 38 shown in FIGS. 2 and 3 is prior to any thermal growth experienced by outer liner 16 and outer casing 30. As seen in FIGS. 4 and 5, however, outer liner 16 and outer casing 30 have each experienced thermal growth, with outer casing 30 having experienced greater thermal growth than outer liner 16 due to its higher coefficient of thermal expansion. Accordingly, outer casing 30 has been permitted to slide or move in a radial direction with respect to longitudinal centerline axis 12 while maintaining substantial alignment with outer liner opening 40 as it expands away from outer liner 16.

Initially, it will be understood that igniter 36 is preferably connected to outer casing 30 by means of an adapter assembly 41 so that igniter 36 will move radially and axially as outer casing 30 experiences thermal growth. Igniter 36 is preferably threaded into adapter assembly 41 and then at least a pair of bolts 43 and 45 are provided to attach adapter assembly 41 to outer casing 30 and ensure this relationship. Igniter 36 is likewise positioned so as to extend through an opening 47 in outer casing 30 and into opening 40 of outer liner 16.

More specifically, it will be seen that igniter mounting assembly 38 preferably includes a first spring member 42 which encircles a tip portion 44 of igniter 36. A first ring member 46 is connected (e.g., by welding or similar methods of attachment) to a first end 48 of first spring member 42 adjacent an outer surface 50 of outer liner 16. A second ring member 52 is connected to a second end 54 of first spring member 42 and positioned against a surface 56 of a shoulder 58 for adapter assembly 41. By extending igniter tip portion 44 through first spring member 42, first ring member 46 and second ring member 52, it will be appreciated that a substantially continuous predetermined load will preferably be provided between igniter 36 and outer liner 16 of at least approximately 3 pounds, more preferably a substantially continuous predetermined load of at least 5 pounds, and optimally a substantially continuous predetermined load in a range of approximately 8–12 pounds (taking into account temperature and expansion variances). In this way, mounting assembly 38 is able to maintain substantial alignment of igniter tip portion 44 with respect to outer liner opening 40 while moving radially with respect to outer liner 16 as outer casing 30 experiences thermal growth greater than outer liner 16. Although second ring member 52 is sized to rest against igniter adapter surface 56 in the figures, it will be appreciated that it may be sized large enough so as to rest against an inner surface 60 of outer casing 30 outside opening 47.

It will be appreciated that igniter 36 is able to move between a first radial position and a second radial position when outer casing 30 experiences thermal growth. Concurrently, a gap 68 between outer casing 30 and outer liner 16 fluctuates depending on the relative thermal growth of such combustor components. Nonetheless, it is preferred that a minimum distance of gap 68 in a range of approximately 0.25–0.35 of an inch be provided, with mounting assembly 38 enabling a maximum distance of gap 68 to be approximately 0.40–0.50 of an inch.

Figure 6:
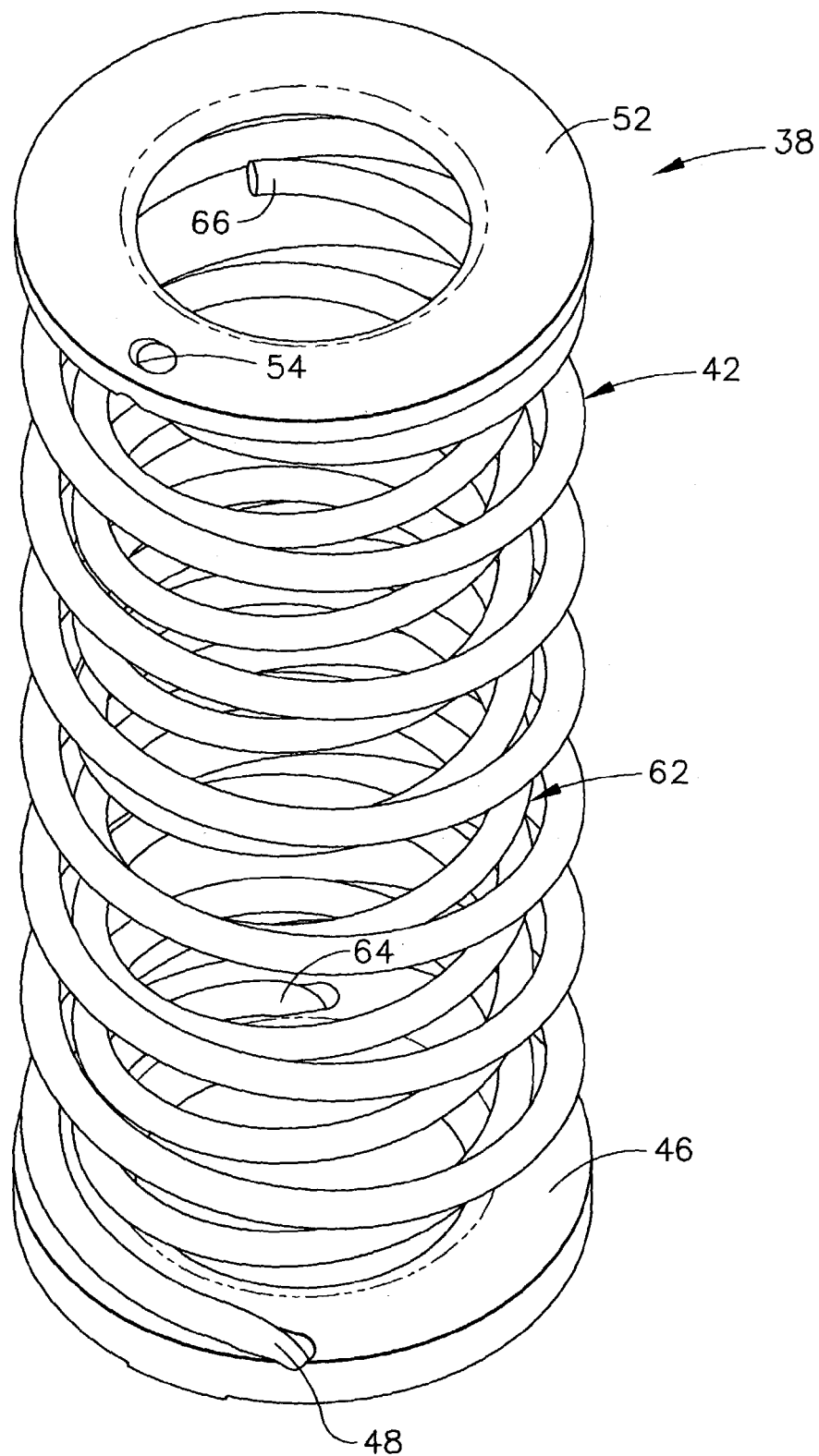
FIG. 6 is a top perspective view of the spring members and washers depicted in FIGS. 1, 2 and 4.
Figure 7:
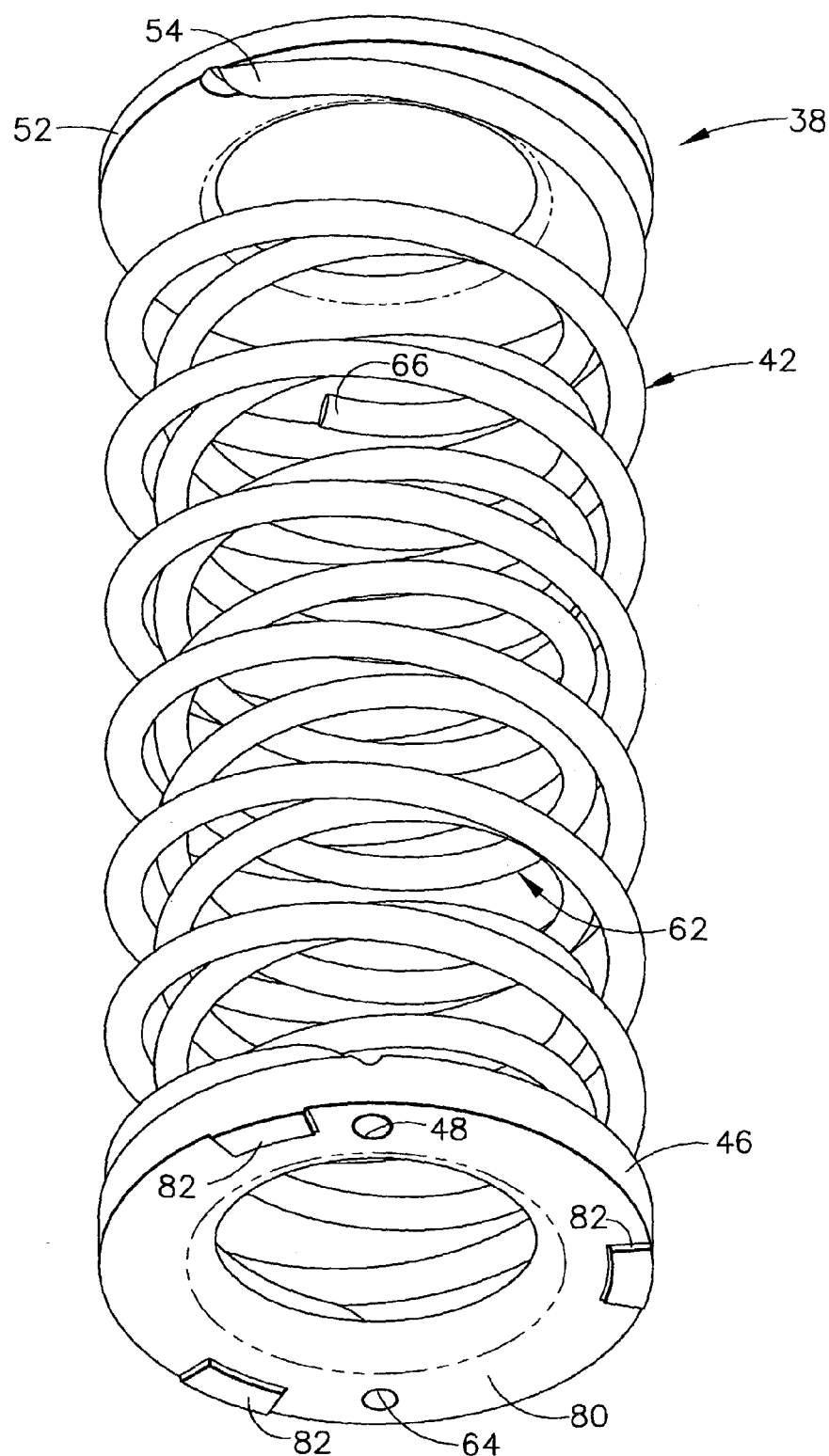
FIG. 7 is a bottom perspective view of the spring members and washers depicted in FIGS. 1, 2, 4 and 6; and, FIG. 8 is an enlarged, partial cross-sectional view of the igniter mounting assembly depicted in FIG. 2.

While igniter mounting assembly 38 requires only first spring member 42 to perform the intended function of the present invention, it will be noted from FIGS. 1, 2, 4, 6 and 7 that a second spring member 62 is preferably utilized in combination with first spring member 42 to provide the desired load between igniter 36 and outer liner 16. It will be seen that second spring member 62 is positioned inside first spring member 42, with first ring member 46 preferably being connected to a first end 64 of second spring member 62. A second end 66 of second spring member 62 need not be connected to second ring member 52 as best seen in FIGS. 6 and 7. Second spring member 62 is provided as a safety measure since it is possible that first spring member 42 could lose some of its modulus of elasticity from the heat experienced in the combustor environment. Thus, it will be appreciated that first spring member 42 provides a certain amount of load between igniter 36 and outer liner 16 and then second spring member 62 provides an additional amount of load as needed.

First and second spring members 42 and 62 may have differing spring constants, wire diameter, number of turns, modulus of elasticity, and other spring characteristics provided they produce the desired amount of load. It will be noted in an exemplary embodiment of mounting assembly 38 that first spring member 42 preferably has a wire diameter of approximately 0.058 of an inch and seven turns while second spring member 62 preferably has a wire diameter of approximately 0.053 of an inch with eight turns. In order to prevent first and second spring members 42 and 62 from being pinched or jammed on one another during operation, it is preferred that they be wound so as to have opposite pitches. Accordingly, it will be seen that first spring member 42 has a left-handed pitch while second spring member 62 has a right-handed pitch. To minimize fluctuations in the functionality of first and second spring members 42 and 62, it is preferred that they (as well as first and second ring members 46 and 52) be made of a material which exhibits good temperature and wear characteristics (e.g., Waspaloy).

It will also be appreciated that igniter 36 is able to move between a first axial position and a second axial position when casing 30 experiences thermal growth. In order to accommodate this, it will be seen from FIGS. 3 and 5 that opening 40 in outer liner 16 is preferably configured to be oblong or ovular so that an axial distance 70 along a major axis 72 is at least slightly larger than a circumferential distance 74 along a minor axis 76. Thus, igniter 36 is able to maintain substantial alignment with respect to opening 40 while moving axially with respect to outer liner 16 as outer casing 30 experiences thermal growth greater than outer liner 16.

Figure 8:
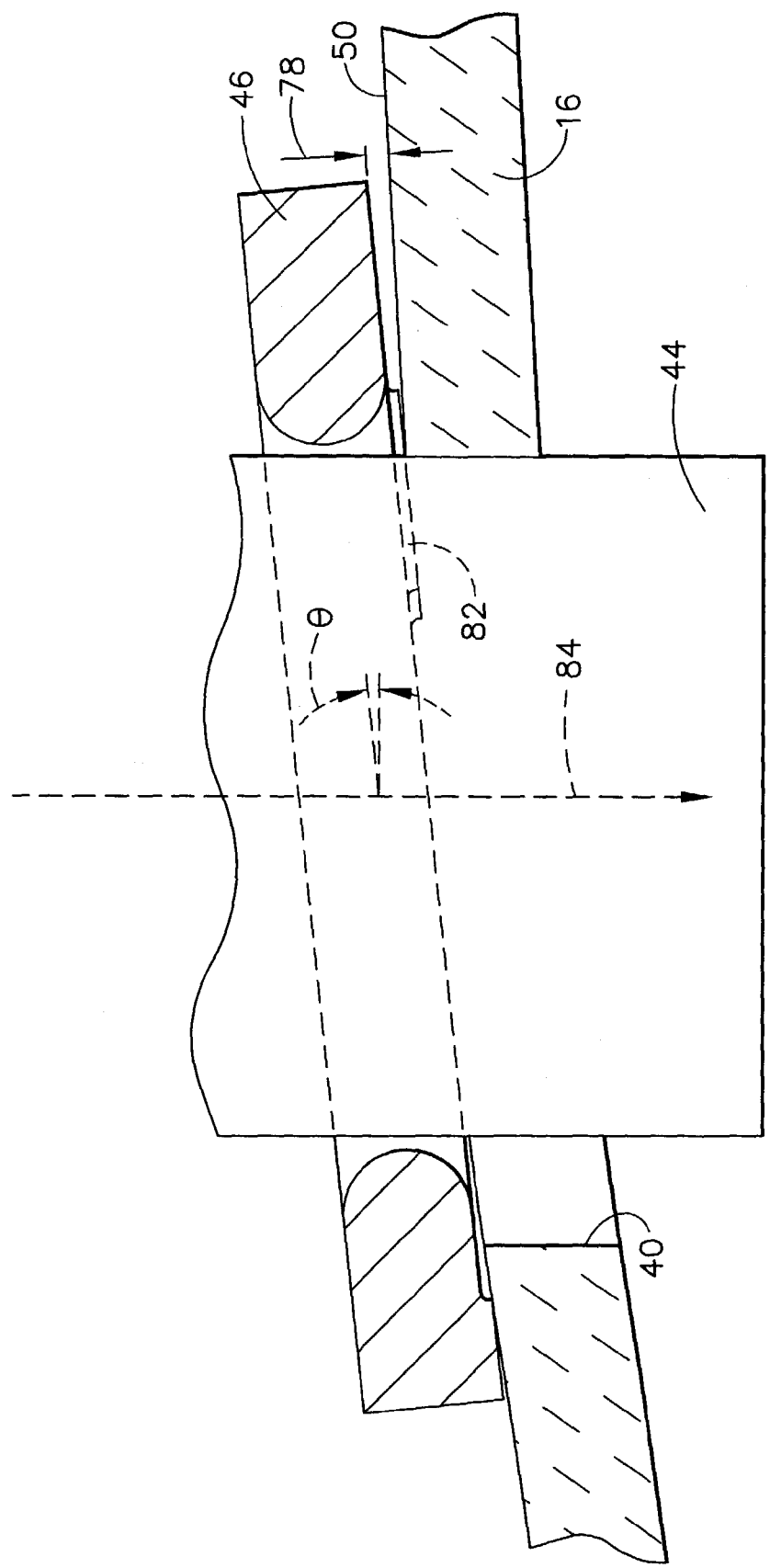

Due to this preferred configuration of outer liner opening 40, where such opening 40 is larger than necessary to permit access by igniter tip portion 44 (see FIGS. 3 and 5), it will be understood that first ring member 46 provides a sealing function to prevent excess air from entering combustion chamber 14 through opening 40. At the same time, it is preferred that a gap 78 (on the order of approximately 5–10 mils) be provided between a lower surface 80 of first ring member 46 and outer surface 50 of outer liner 16 (see FIG. 8). This not only prevents first ring member 46 from wearing into outer liner 16, but also provides a desirable flow of air therethrough which assists in cooling first ring member 46. Such air flow is not permitted, however, to overcome the predetermined load provided by first and second spring members 42 and 62, thereby preventing first ring member 46 from lifting. In order to provide such gap 78, it is preferred that a plurality of feet 82 be located on lower surface 80 of first ring member 46. Optimally, three feet 82 will be provided so that contact will be maintained with outer surface 50 even as first ring member 46 is permitted to move or rotate at an angle θ to an axis 84 extending through igniter 36. Feet 82 are preferably treated with a wear coating (e.g., Tribaloy®) in order to promote greater durability. It will be understood that first and second spring members 42 and 62 allow this movement of first ring member 42 since only a portion of such spring members on one side may be compressed (or be compressed greater) than on another side portion.

In light of the foregoing discussion, it will be appreciated that igniter 36 is able to move between a first radial position and a second radial position, as well as between a first axial position and a second axial position, when outer casing 30 experiences thermal growth greater than outer liner 16 and still maintain substantial alignment with outer liner opening 40. At the same time, it is preferred that igniter 36 be substantially fixed circumferentially with respect to outer liner 16.

Igniter mounting assembly 38 reflects a method of mounting igniter 36 with respect to outer casing 30 and outer liner 16. Since outer liner 16 is made of a material having a lower coefficient of thermal expansion than outer casing 30, the method preferably includes an initial step of fixedly connecting igniter 36 to outer casing 30. This may be accomplished in various ways, but is shown to be performed via adapter assembly 41. Accordingly, an integral relationship is maintained between igniter 36 and outer casing 30, which is necessary since igniter 36 must extend through opening 47 in outer casing 30.

Secondly, the method preferably includes the step of mounting igniter 36 between outer casing 30 and outer liner 16 in a manner so as to maintain substantial alignment with opening 40 in outer liner 16 during radial movement of outer casing 30 with respect to outer liner 16. The method may also include the step of configuring opening 40 in outer liner 16 in a manner so as to maintain substantial alignment between igniter 36 and outer liner opening 40 during axial movement of outer casing 30 with respect to outer liner 16. An additional step associated with the method may include substantially sealing the area around outer liner opening 40 to prevent excess air from entering combustion chamber 14.

Finally, the method may include the step of mounting igniter 36 between outer casing 30 and outer liner 16 in a manner so as to prevent circumferential movement of outer casing 30 with respect to outer liner 16.

Having shown and described the preferred embodiment of the present invention, further adaptations of the mounting assembly 38 for an igniter 36 of a combustor 10 having an outer liner 16 made of ceramic matrix composite material can be accomplished by appropriate modifications by one of ordinary skill in the art without departing from the scope of the invention. Moreover, it will be understood that more than one igniter and accompanying mounting assembly may be utilized in such combustor.

What is claimed is:

1. An assembly for mounting an igniter in a gas turbine engine combustor between an outer casing and an outer liner, wherein a longitudinal centerline axis extends through said gas turbine engine, said igniter mounting assembly comprising:
   (a) a first spring member encircling a portion of said igniter and being positioned between a surface adjacent said outer casing and an outer surface of said outer liner;
   (b) a first ring member connected to a first end of said first spring member adjacent said outer surface of said outer liner; and,
   (c) a second ring member connected to a second end of said first spring member adjacent said surface adjacent said outer casing;
   wherein said igniter maintains substantial alignment with respect to an opening in said outer liner while moving radially and axially with respect to said outer liner as said outer casing experiences thermal growth greater than said outer liner, said igniter being the sole structure in said opening and said opening being longer in an axial direction than in a transverse direction.

2. The igniter mounting assembly of claim 1, further comprising a second spring member positioned inside said first spring member, said first ring member being connected to a first end of said second spring member adjacent said outer liner.

3. The igniter mounting assembly of claim 2, wherein said first and second spring members provide a predetermined load on said igniter.

4. The igniter mounting assembly of claim 2, wherein said first and second spring members are wound so as to have opposite pitches.

5. The igniter mounting assembly of claim 1, further comprising a plurality of feet portions extending from a surface of said first ring member adjacent said outer surface of said outer liner.

6. The igniter mounting assembly of claim 5, wherein a gap between said outer liner and said first ring member surface is provided to permit a predetermined amount of air flow therebetween.

7. The igniter mounting assembly of claim 1, wherein said outer liner is made of a ceramic matrix composite.

8. The igniter mounting assembly of claim 1, wherein said outer casing is made of a metal.

9. The igniter mounting assembly of claim 1, wherein said igniter is able to move between a first radial position and a second radial position.

10. The igniter mounting assembly of claim 1, wherein said igniter is able to move between a first axial position and a second axial position.

11. The igniter mounting assembly of claim 1, wherein said first ring member is able to move at an angle to an axis through said igniter.

12. The igniter mounting assembly of claim 1, wherein a minimum gap between said outer casing and said outer liner is maintained.

13. The igniter mounting assembly of claim 1, said first ring member being configured to seal excess air from entering said opening in said outer liner.

14. A combustor for a gas turbine engine having a longitudinal centerline axis extending therethrough, comprising:
   (a) an outer liner having a forward end and an aft end, said outer liner being made of a ceramic matrix composite material and having an opening formed therein longer in an axial direction than in a transverse direction;
   (b) an outer casing spaced radially from said outer liner so as to form an outer passage therebetween, said outer casing being made of a metal and having an opening formed therein substantially aligned with said outer liner opening;
   (c) an igniter fixedly connected to said outer casing and positioned so as to extend through said opening in said outer casing; and,
   (d) an assembly for mounting said igniter between said outer casing and said outer liner, wherein said igniter is mounted in said opening separate from a fuel injection device, said igniter mounting assembly further comprising:
      (1) a first spring member positioned between a surface of said igniter adapter and an outer surface of said outer liner;
      (2) a first ring member connected to a first end of said spring member adjacent said outer surface of said outer liner; and,
      (3) a second ring member connected to a second end of said spring member adjacent said igniter adapter surface;
   wherein said igniter maintains substantial alignment with respect to said opening in said outer liner while moving radially and axially with respect to said outer liner as said outer casing experiences thermal growth greater than said outer liner.

15. The combustor of claim 14, said combustor further comprising an igniter adapter connected to said outer casing, wherein said igniter is connected to said igniter adapter.

16. The combustor of claim 14, said igniter mounting assembly further comprising a second spring member positioned inside said spring member, said first ring member being connected to a first end of said second spring member adjacent said outer liner.

17. The combustor of claim 14, further comprising a plurality of feet portions extending from a surface of said first ring member adjacent said outer surface of said outer liner.

18. The combustor of claim 17, wherein a gap between said outer surface of said outer liner and said first ring member surface is provided to permit a predetermined amount of air flow therebetween.

19. The combustor of claim 14, said first ring member being configured to substantially seal said opening in said outer liner.

20. The combustor of claim 14, wherein said first ring member is able to move at an angle to an axis through said igniter.

21. The combustor of claim 14, wherein a minimum gap between said outer casing and said outer liner is maintained.

22. The combustor of claim 14, wherein said igniter mounting assembly provides a substantially continuous predetermined load on said igniter.

23. A method of mounting an igniter between an outer casing and an outer liner of a combustor in a gas turbine engine having a longitudinal centerline axis therethrough, wherein said outer liner is made of a material having a lower coefficient of thermal expansion than said outer casing, comprising the steps of:

(a) fixedly connecting said igniter to said outer casing so as to extend through an opening in said outer casing; and, (b) mounting said igniter between said outer casing and said outer liner in a manner which maintains substantial alignment with an opening in said outer liner during radial and axial movement of said outer casing with rest to said outer liner, wherein said igniter is the sole structure within said opening and said opening is longer in an axial direction than in a transverse direction.

* * * * *

UNITED STATES PATENT AND TRADEMARK OFFICE
CERTIFICATE OF CORRECTION

PATENT NO.     : 6,920,762 B2
DATED          : July 26, 2005
INVENTOR(S)    : Thomas Allen Wells et al.

It is certified that error appears in the above-identified patent and that said Letters Patent is hereby corrected as shown below:

Column 8,
Line 53, add -- first -- between "said" (first occurrence) and "spring".

Column 10,
Line 7, delete "rest" and substitute -- respect --.

Signed and Sealed this

Sixteenth Day of May, 2006

JON W. DUDAS
*Director of the United States Patent and Trademark Office*